US009214179B2

(12) United States Patent
Maeda et al.

(10) Patent No.: US 9,214,179 B2
(45) Date of Patent: Dec. 15, 2015

(54) MAGNETIC RECORDING MEDIUM, METHOD OF MANUFACTURING THE SAME, AND MAGNETIC RECORDING/REPRODUCTION APPARATUS

(71) Applicant: Kabushiki Kaisha Toshiba, Tokyo (JP)

(72) Inventors: Tomoyuki Maeda, Kawasaki (JP); Yousuke Isowaki, Yokohama (JP); Akira Watanabe, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 260 days.

(21) Appl. No.: 14/055,719

(22) Filed: Oct. 16, 2013

(65) Prior Publication Data

US 2014/0042013 A1      Feb. 13, 2014

Related U.S. Application Data

(62) Division of application No. 13/351,127, filed on Jan. 16, 2012.

(30) Foreign Application Priority Data

Apr. 26, 2011   (JP) .................. 2011-098304

(51) Int. Cl.
  *C23C 14/34*     (2006.01)
  *G11B 5/855*     (2006.01)
  (Continued)

(52) U.S. Cl.
  CPC .............. *G11B 5/855* (2013.01); *G11B 5/7325* (2013.01); *G11B 5/746* (2013.01)

(58) Field of Classification Search
  CPC ....... G11B 5/7325; G11B 5/746; G11B 5/855

USPC .............. 204/192.2; 427/127, 128, 129, 130, 427/131, 132
  See application file for complete search history.

(56) References Cited

U.S. PATENT DOCUMENTS 6,686,071 B2    2/2004  Sakakima et al.
6,841,224 B2    1/2005  Kamata et al.
(Continued)

FOREIGN PATENT DOCUMENTS

JP    2002-063712    2/2002
JP    3886802        2/2007
(Continued)

OTHER PUBLICATIONS

"Thermal Conductivity of Metals," www.theengineeringtoolbox.com/thermal-conductivity-metals-d_858.html, Jul. 2013.

*Primary Examiner* — Rodney McDonald
(74) *Attorney, Agent, or Firm* — Knobbe, Martens, Olson & Bear LLP

(57) ABSTRACT

According to one embodiment, a magnetic recording medium includes a substrate, an auxiliary layer formed on the substrate, and at least one perpendicular magnetic recording layer formed on the auxiliary layer. The perpendicular magnetic recording layer includes a magnetic dot pattern. The perpendicular magnetic recording layer is made of an alloy material containing one element selected from iron and cobalt, and one element selected from platinum and palladium. This alloy material has the $L1_0$ structure, and is (001)-oriented. The auxiliary layer includes a dot-like first region covered with the magnetic dot pattern, and a second region not covered with the magnetic dot pattern. The first region is made of a (100)-oriented nickel oxide. The second region contains nickel used in the first region as a main component.

3 Claims, 4 Drawing Sheets

(51) Int. Cl.
  *G11B 5/73* (2006.01)
  *G11B 5/74* (2006.01)

(56) References Cited

U.S. PATENT DOCUMENTS

| | | |
|---|---|---|
| 7,166,261 B2 | 1/2007 | Kamata et al. |
| 7,232,621 B2 | 6/2007 | Kamata et al. |
| 8,338,007 B2 | 12/2012 | Kimura et al. |
| 2002/0142192 A1 | 10/2002 | Kamata et al. |
| 2004/0185307 A1 | 9/2004 | Oikawa et al. |
| 2004/0191557 A1 | 9/2004 | Kamata et al. |
| 2004/0258833 A1 | 12/2004 | Kamata et al. |
| 2006/0154110 A1 | 7/2006 | Hohlfeld et al. |
| 2009/0151875 A1 | 6/2009 | Maeda et al. |
| 2009/0161255 A1 | 6/2009 | Maeda |
| 2010/0098972 A1 | 4/2010 | Maeda |
| 2010/0165508 A1 | 7/2010 | Girt et al. |
| 2012/0275059 A1 | 11/2012 | Maeda et al. |
| 2013/0075358 A1 | 3/2013 | Kimura et al. |

FOREIGN PATENT DOCUMENTS

| | | |
|---|---|---|
| JP | 2009-080902 | 4/2009 |
| JP | 2009-151875 | 7/2009 |

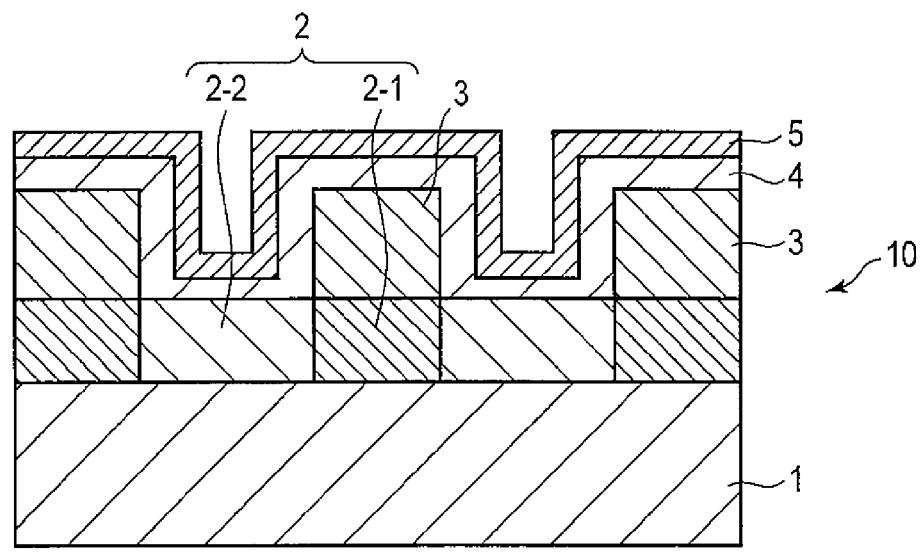
F I G. 1
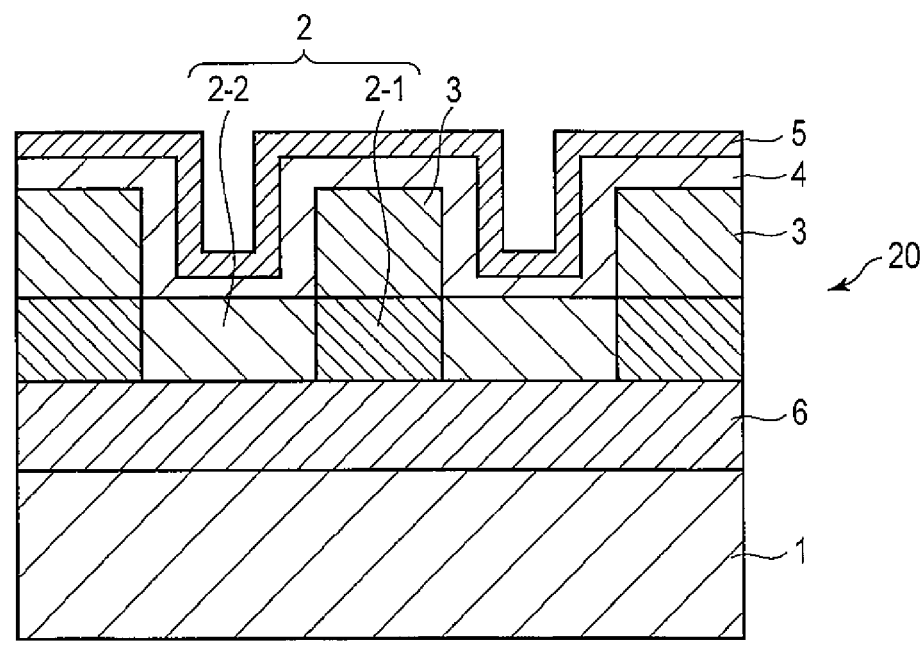
F I G. 2

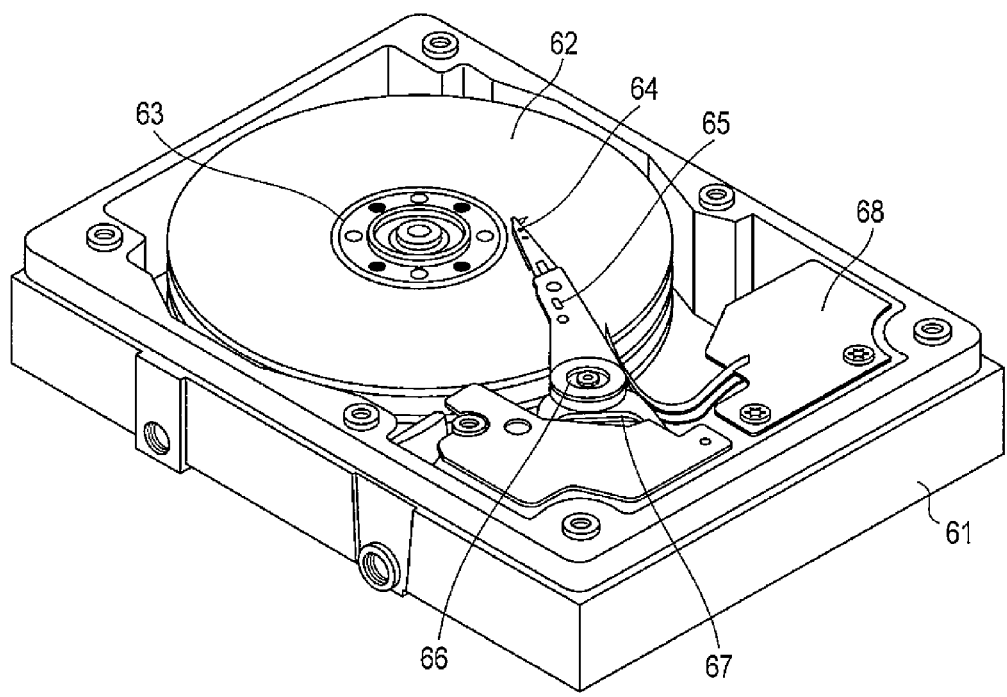
F I G. 6

MAGNETIC RECORDING MEDIUM, METHOD OF MANUFACTURING THE SAME, AND MAGNETIC RECORDING/REPRODUCTION APPARATUS

CROSS-REFERENCE TO RELATED APPLICATIONS

This application is a divisional of U.S. application Ser. No. 13/351,127, filed Jan. 16, 2012, now abandoned, which is based upon and claims the benefit of priority from prior Japanese Patent Application No. 2011-098304, filed Apr. 26, 2011, the entire contents of both of which are incorporated herein by reference.

FIELD

Embodiments described herein relate generally to a magnetic recording medium and magnetic recording/reproduction apparatus.

BACKGROUND

Magnetic memory devices (HDDs) mainly used in computers to record and reproduce information are recently beginning to be used in various applications because they have large capacities, inexpensiveness, high data access speeds, a high data retaining reliability, and the like, and they are now used in various fields such as household video decks, audio apparatuses, and automobile navigation systems. As the range of applications of the HDDs extends, demands for large storage capacities increase, and high-density HDDs are more and more extensively developed in recent years.

As a magnetic recording method of presently commercially available HDDs, a perpendicular magnetic recording method is recently rapidly finding widespread use as a technique replacing the conventional in-plane magnetic recording method. In the perpendicular magnetic recording method, magnetic crystal grains forming a perpendicular magnetic recording layer for recording information have the axis of easy magnetization in a direction perpendicular to a substrate.

To increase the recording density of the perpendicular magnetic recording medium, noise must be reduced while a high thermal stability is maintained. A method generally used as a noise reducing method is to reduce the magnetic interaction between the magnetic crystal grains in the recording layer by magnetically isolating the grains in the film surface, and decrease the size of the grains themselves at the same time. A practical example of the generally used method is a method of adding $SiO_2$ or the like to the recording layer, thereby forming a perpendicular magnetic recording layer having a so-called granular structure in which each magnetic crystal grain is surrounded by a grain boundary region mainly containing the additive. If noise is reduced by this method, however, it is inevitably necessary to increase the magnetic anisotropic energy (Ku) of the magnetic crystal grains, as the magnetization reversal volume reduces, in order to ensure a high thermal stability. If the magnetic anisotropic energy of the magnetic crystal grains is increased, however, a saturation magnetic field Hs and coercive force Hc also increase. Since this increases a recording magnetic field necessary for magnetization reversal for data write as well, the writability of a recording head decreases. As a consequence, the recording/reproduction characteristics deteriorate.

To solve this problem, a patterned medium in which magnetic dots are formed by micropatterning a perpendicular magnetic recording layer and are magnetically isolated from each other is being studied. In the patterned medium, the magnetic crystal grains in the perpendicular magnetic recording layer need only be magnetically isolated not for every crystal grain but for every magnetic dot having a size corresponding to one bit and containing a few to a few ten crystal grains. This makes the magnetization reversal volume larger than that of the granular structure. Accordingly, the Ku value required to assure a high thermal stability can be decreased. This makes it possible to suppress the increases in Hs and Hc, and suppress a magnetic field (switching field) necessary for magnetization reversal.

On the other hand, in the patterned medium, the switching field distribution (SFD) of each magnetic dot must be minimized in order to allow a designated magnetic dot to reliably reverse magnetization with respect to a recording magnetic field having a given preset intensity, and prevent magnetization reversal of adjacent dots. One big cause of the SFD is the influence of the magnetostatic interaction between dots. That is, the magnitude of a demagnetizing field generated in a given dot from surrounding dots changes in accordance with the difference between recording magnetization patterns. Consequently, an effective switching field changes in accordance with a recording pattern. Since the magnetostatic interaction between dots increases as the dot pitch decreases, the SFD increases as the density increases.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a sectional view showing an example of a magnetic recording medium according to an embodiment;

FIG. 2 is a sectional view showing another example of the magnetic recording medium according to the embodiment;

FIG. 6 is a partially exploded perspective view showing an example of a magnetic recording/reproduction apparatus according to the embodiment.

DETAILED DESCRIPTION

Figure 3:
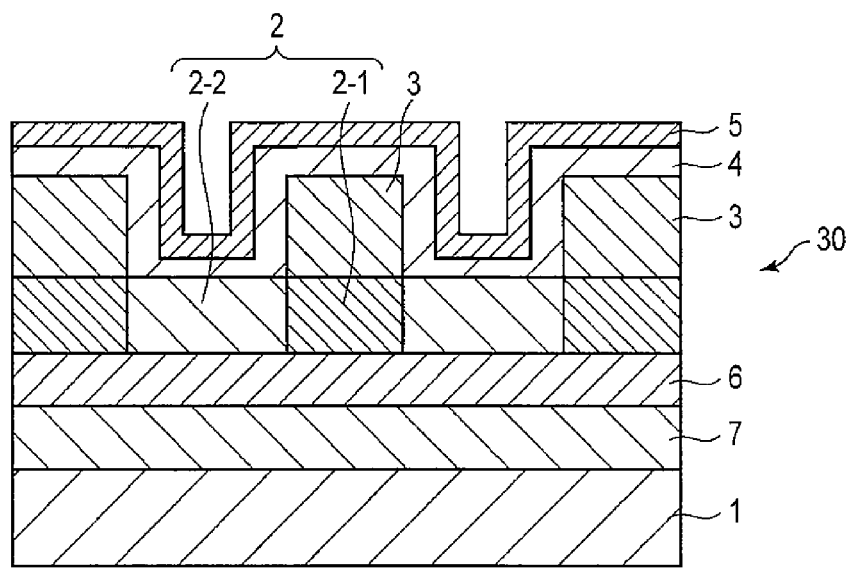
FIG. 3 is a sectional view showing still another example of the magnetic recording medium according to the embodiment.

Various embodiments will be described hereinafter with reference to the accompanying drawings.

In general, according to one embodiment, a magnetic recording medium includes a substrate, an auxiliary layer formed on the substrate, and at least one perpendicular magnetic recording layer formed on the auxiliary layer.

The perpendicular magnetic recording layer has a magnetic dot pattern.

The perpendicular magnetic recording layer is made of an alloy material containing one element selected from iron and cobalt, and one element selected from platinum and palladium. This alloy material has the $L1_0$ structure, and is (001)-oriented.

The auxiliary layer includes a dot-like first region covered with the magnetic dot pattern, and a second region not covered with the magnetic dot pattern. The first region is made of a (100)-oriented nickel oxide. The second region contains nickel used in the first region as a main component.

The "main component" herein mentioned means a component whose content is largest in the region. For example, the second region can contain nickel alone, or can contain nickel as most of the region and a micro amount of a nickel oxide or the like.

A protective layer can be formed on the perpendicular magnetic recording layer. Alternatively, a lubricant layer can be formed on the perpendicular magnetic recording layer. The protective layer can be formed between the perpendicular magnetic recording layer and lubricant layer.

A method of manufacturing the magnetic recording medium according to the embodiment includes the step of forming, on a substrate, an auxiliary layer by depositing a (100)-oriented nickel oxide, the step of forming, on the auxiliary layer, a perpendicular magnetic recording layer made of a (001)-oriented alloy containing one element selected from iron and cobalt and one element selected from platinum and palladium, and having the $L1_0$ structure, the step of partially exposing the auxiliary layer by processing the perpendicular magnetic recording layer into a magnetic dot pattern, and the step of depositing a protective layer on the perpendicular magnetic recording layer.

In the above-mentioned method, before the formation of the protective layer, e.g., during or after the formation of the magnetic dot pattern, the magnetic dot pattern and auxiliary layer are exposed to a reducing ambient, and the partially exposed auxiliary layer made of the nickel oxide is reduced by using the magnetic dot pattern as a mask, thereby forming, in the auxiliary layer, a dot-like first region covered with the magnetic dot pattern and made of a (100)-oriented nickel oxide, and a second region not covered with the magnetic dot pattern and containing nickel as a main component.

This embodiment provides a perpendicular magnetic recording medium that reduces the switching field distribution of each magnetic dot and has a high thermal decay resistance, thereby making high-density recording possible.

FIG. 1 is a sectional view showing an example of the patterned medium according to the embodiment.

The embodiments will be described with reference to the accompanying drawings.

In a patterned medium 10 as shown in FIG. 1, an auxiliary layer 2, perpendicular magnetic recording layer 3, protective layer 4, and lubricant layer 5 are sequentially stacked on a substrate 1. The perpendicular magnetic recording layer 3 has a pattern in which hard magnetic dots are finely arranged. The auxiliary layer 2 has a structure in which first regions 2-1 made of NiO are two-dimensionally surrounded by a second region 2-2 made of Ni. Hard magnetic dots 3 are stacked on the first regions 2-1 made of NiO.

As a nonmagnetic substrate used in the embodiment, it is possible to use, e.g., a glass substrate, an Al-based alloy substrate, an Si single-crystal substrate having an oxidized surface, ceramics, or plastic. In addition, the same effect can be expected even when the surface of any of these nonmagnetic substrates is plated with an NiP alloy or the like.

(Magnetic Dot Patterning Method (Milling))

The perpendicular magnetic recording layer of the patterned medium used in the embodiment has a fine array structure patterned into hard magnetic dots and a nonmagnetic region.

The perpendicular magnetic recording layer according to the embodiment has a fine shape array structure formed by patterning. An example of the patterning method is as follows. That is, after the medium surface is coated with a mask material such as SOG (Spin On Glass), a three-dimensional pattern is formed on the mask by nanoimprinting by using a stamper on which the dot pattern is transferred. Then, the perpendicular magnetic recording layer is etched by Ar ion milling, and the SOG mask is removed by reactive ion milling (RIE) by using $CF_4$ gas. Another example is a method in which after a self-organizing pattern is formed on the medium surface by a self-organization phenomenon of a PS (polystyrene)-PMMA (polymethylmethacrylate) diblock polymer and RIE using $O_2$ gas, the pattern is coated with SOG, and RIE using $O_2$ gas is performed again, thereby forming a dot-shaped mask made of SOG and milling it in the same manner as above.

(Recording Layer Material)

The hard magnetic dots of the patterned medium according to the embodiment contain hard magnetic crystal grains having the axis of easy magnetization perpendicular to the substrate. As the hard magnetic crystal grain material used in the embodiment, it is possible to use a material that achieves an appropriate Hc and Hn in order to suppress the generation of a reverse magnetic domain against, e.g., an external magnetic field and floating magnetic field, and has a high Ku in order to obtain a sufficient thermal decay resistance. As the hard magnetic crystal material, a material having the $L1_0$ structure and mainly containing a magnetic metal element and noble metal element can be used. The magnetic metal is at least one element selected from Fe and Co, and the noble metal element is at least one element selected from the group consisting of Pt and Pd. More specifically, it is possible to use an Fe—Pt alloy, Co—Pt alloy, or Fe—Pd alloy in which the atomic number ratio of magnetic element:noble metal element falls within the range of 4:6 to 6:4. When the $L1_0$ structure is given to (an ordered alloy is formed by) any of these materials, the material can achieve a very high Ku of $10^7$ erg/cc or more in the c-axis direction, and hence has a high thermal decay resistance. To improve the magnetic characteristics or electromagnetic conversion characteristics, it is also possible to add a proper amount of an element such as Cu, Zn, Zr, Cr, Ru, or Ir to the hard magnetic recording layer. Whether the crystal grains forming the hard magnetic recording layer have the $L1_0$ structure can be confirmed by a general X-ray diffraction apparatus. The $L1_0$ structure exists if (ordered lattice reflection) peaks representing planes such as (001) and (003) which are not observed in a disordered face-centered cubic lattice (FCC) can be observed at diffraction angles matching the respective interplanar spacings. Also, an order S is generally used as an index for evaluating whether the hard magnetic crystal grains have a structure close to a complete $L1_0$ structure. The structure is a complete $L1_0$ structure when S=1, and a complete disordered structure when S=0. The Ku of the above-described alloy generally tends to increase as the order S increases. The order S can be evaluated by the following equation by using (001) and (002) peak integrated intensities obtained by X-ray diffraction measurements.

$$S=0.72(I_{001}/I_{002})^{1/2}$$

where $I_{001}$ and $I_{002}$ are respectively the diffraction peak integrated intensities of (001) and (002) planes.

Whether the hard magnetic crystal material is oriented in the (001) plane (c-axis) can also be confirmed by a general X-ray diffraction apparatus.

(Perpendicular Magnetic Recording Layer Thickness)

The total thickness of the perpendicular magnetic recording layer is determined by the required value of the system, and can be, e.g., 0.5 (inclusive) to 30 (exclusive) nm. The total thickness can also be 5 (inclusive) to 10 (exclusive) nm. If the total thickness is less than 0.5 nm, the signal intensity of the recording/reproduction characteristics significantly decreases. If the total thickness is equal to or larger than 30 nm, the above-described patterning process becomes difficult to perform.

(Method of Manufacturing Perpendicular Magnetic Recording Layer)

When the substrate temperature is increased to 250° C. to 700° C. during the deposition of the above-described hard magnetic material, the formation of the ordered alloy is promoted. The substrate temperature can further be increased to 300° C. to 400° C. If the substrate temperature is less than 250° C., the order S decreases. If the substrate temperature exceeds 700° C., deterioration such as cracking often occurs on the substrate. Also, when depositing the above-described hard magnetic material by sputtering, the order S can increase when the sputtering gas pressure of, e.g., Ar is 3 to 12 Pa. The order S can further increase when the sputtering gas pressure is 5 to 10 Pa.

(Auxiliary Layer)

In the perpendicular magnetic recording medium according to the embodiment, the auxiliary layer made of a material mixture containing Ni as a ferromagnetic metal and (100)-oriented NiO is formed below the perpendicular magnetic recording layer. As shown in FIG. 1, Ni as a ferromagnetic metal is mainly formed in a region not covered with the hard magnetic dots of the perpendicular magnetic recording layer, and NiO is mainly formed in regions covered with the hard magnetic dots. (100)-oriented NiO has an NaCl type crystal structure and a relatively high lattice matching with the above-described hard magnetic crystal grain material, and hence can orient the hard magnetic crystal grains formed in the upper layer along the c-axis, and point the axis of easy magnetization in the direction perpendicular to the substrate.

In the interface with the auxiliary layer, most hard magnetic dots are in contact with NiO as an antiferromagnetic material, so the area of contact with the region of Ni as a ferromagnetic metal is very small. This weakens the exchange interaction between the hard magnetic dots and Ni region. On the other hand, a strong exchange interaction is acting in the Ni region because the Ni region two-dimensionally continues in the plane of the auxiliary layer. Consequently, a weak exchange interaction between the hard magnetic dots and Ni and a strong exchange interaction in the Ni region act in series between adjacent hard magnetic dots, thereby generating a weak exchange interaction. Since the weak exchange magnetic field acting on the dots always functions in a direction to cancel demagnetizing fields from surround hard magnetic dots, the influence of the demagnetizing fields can be reduced. This makes it possible to effectively reduce the SFD described previously. Whether Ni as a ferromagnetic metal is formed in the region not covered with the hard magnetic dots can be confirmed by, e.g., observing the medium surface by TEM-EDX analysis combining energy dispersive X-ray spectroscopy (EDX) with transmission electron microscope (TEM) observation.

(Method of Forming Auxiliary Layer)

An example of a method of forming the auxiliary layer as described above is a method in which after NiO and a hard magnetic material are sequentially deposited on a substrate, the medium surface is exposed to a reducing ambient after Ar milling of perpendicular magnetic recording layer patterning or mask removal, thereby reducing an NiO portion not covered with hard magnetic dots into Ni. Consequently, as shown in FIG. 1, NiO is not reduced but maintained in regions below and covered with the hard magnetic dots, and NiO is reduced to form Ni in only an uncovered region. In this structure, the crystal faces need not be oriented in one direction in the Ni region. Also, the reduction depth of NiO need not always cover the entire film thickness of NiO. This structure is the same as a structure in which NiO is formed as a nonmagnetic underlayer (to be described later) below the auxiliary layer.

As the above-mentioned reducing method, it is possible to use a method of exposing the medium surface to a gas ambient containing hydrogen, or a method of irradiating the medium surface with a hydrogen plasma or hydrogen ions.

(Auxiliary Layer Thickness)

The auxiliary layer thickness can be 0.5 to 15 nm, and can also be 1 to 5 nm. If this thickness is less than 0.5 nm, the above-described SFD reducing effect hardly appears. If the thickness exceeds 15 nm, the demagnetizing field of the ferromagnetic metal crystal grain itself increases, and the Hn of the perpendicular magnetic recording layer tends to deteriorate.

(Underlayer)

FIG. 2 is a sectional view showing another example of the patterned medium according to the embodiment.

In a patterned medium 20 as shown in FIG. 2, a nonmagnetic underlayer 6, auxiliary layer 2, perpendicular magnetic recording layer 3, protective layer 4, and lubricant layer 5 are sequentially stacked on a substrate 1. The perpendicular magnetic recording layer 3 has a pattern in which hard magnetic dots are finely arranged. The auxiliary layer 2 has a structure in which first regions 2-1 made of NiO are two-dimensionally surrounded by a second region 2-2 made of Ni. Hard magnetic dots 3 are stacked on the first regions 2-1 made of NiO.

To reduce the orientation dispersion in the auxiliary layer and perpendicular magnetic recording layer, an underlayer made of a nonmagnetic material can be formed between the auxiliary layer and substrate. This nonmagnetic underlayer can also reduce the exchange interaction between the auxiliary layer and perpendicular magnetic recording layer, which poses a problem when using a soft magnetic underlayer (to be described later).

As a practical material, it is possible to use (100)-oriented MgO, (100)-oriented TiN, or (100)-oriented Cr. The (100) orientation dispersion of NiO in the auxiliary layer can be reduced by using any of these materials. In addition, the interaction with a soft magnetic underlayer can be reduced by leaving the nonmagnetic NiO layer as an underlayer without reducing the lower portion of the auxiliary layer as described above.

(Underlayer Thickness)

The thickness of the nonmagnetic underlayer can be, e.g., 1 to 50 nm, and can also be 5 to 10 nm. If this thickness is less than 1 nm, the above-described orientation dispersion reducing effect does not remarkably appear. If the thickness exceeds 50 nm, the surface roughness caused by the increase in crystal grain size in the underlayer often becomes conspicuous.

(Seed Layer)

FIG. 3 is a sectional view showing still another example of the patterned medium according to the embodiment.

In a patterned medium 30 as shown in FIG. 3, an amorphous seed layer 7, nonmagnetic underlayer 6, auxiliary layer 2, perpendicular magnetic recording layer 3, protective layer 4, and lubricant layer 5 are sequentially stacked on a substrate 1. The perpendicular magnetic recording layer 3 has a pattern in which hard magnetic dots are finely arranged. The auxiliary layer 2 has a structure in which first regions 2-1 made of NiO are two-dimensionally surrounded by a second region 2-2 made of Ni. Hard magnetic dots 3 are stacked on the first regions 2-1 made of NiO.

When a seed layer made of an amorphous alloy containing Ni is formed between the nonmagnetic underlayer and substrate, the (100) orientation dispersion of the nonmagnetic underlayer can improve. "Amorphous" herein mentioned does not necessarily mean a complete amorphous material such as glass, and may also include a film in which fine crystal grains having a grain size of 2 nm or less are locally oriented at random. As the alloy containing Ni as described above, it is possible to use an alloy system such as an Ni—Nb, Ni—Ta, Ni—Zr, Ni—W, Ni—Mo, or Ni—V alloy. An amorphous film readily forms when the Ni content in any of these alloys is 20 to 70 at %. In addition, the seed layer surface can be exposed to an oxygen-containing ambient.

The thickness of the amorphous seed layer can be 1 to 50 nm, and can also be 5 to 10 nm. If this thickness is less than 1 nm, the above-described orientation dispersion reducing effect does not noticeably appear. If the thickness exceeds 50 nm, the magnetic space between a soft magnetic underlayer (to be described later) and the perpendicular magnetic recording layer excessively spreads, and the writability of the recording/reproduction characteristics decreases.

(Soft Magnetic Underlayer)

Figure 4:
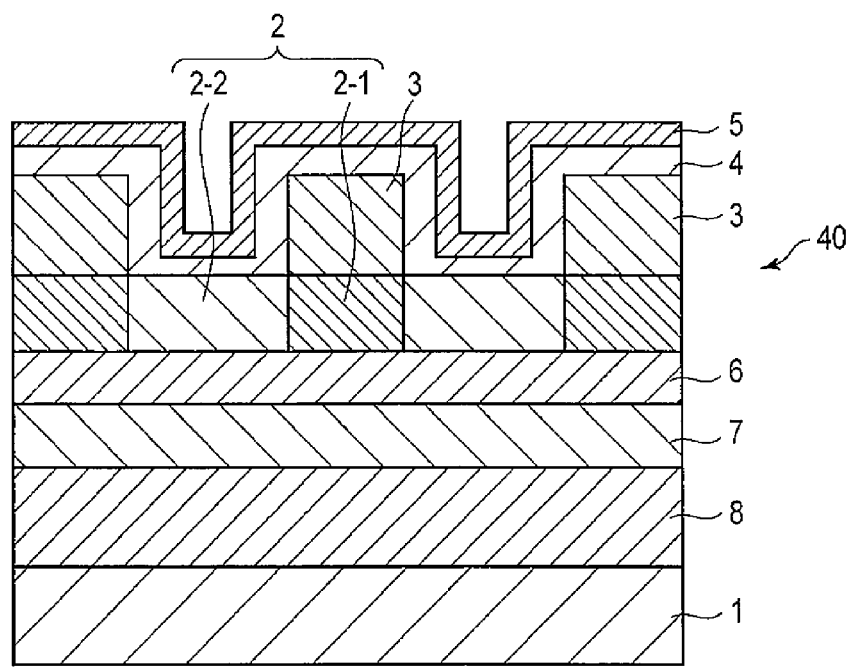
FIG. 4 is a sectional view showing still another example of the magnetic recording medium according to the embodiment.

FIG. 4 is a sectional view showing still another example of the patterned medium according to the embodiment.

In a patterned medium 40 as shown in FIG. 4, a soft magnetic underlayer 8, amorphous seed layer 7, nonmagnetic underlayer 6, auxiliary layer 2, perpendicular magnetic recording layer 3, protective layer 4, and lubricant layer 5 are sequentially stacked on a substrate 1. The perpendicular magnetic recording layer 3 has a pattern in which hard magnetic dots are finely arranged. The auxiliary layer 2 has a structure in which first regions 2-1 made of NiO are two-dimensionally surrounded by a second region 2-2 made of Ni. Hard magnetic dots 3 are stacked on the first regions 2-1 made of NiO.

A so-called perpendicular double-layered medium is obtained by forming a high-permeability soft magnetic underlayer between the nonmagnetic underlayer and substrate. In this perpendicular double-layered medium, the soft magnetic underlayer horizontally passes a recording magnetic field from a magnetic head, e.g., a single-pole head for magnetizing the perpendicular magnetic recording layer, and returns the magnetic field toward the magnetic head, i.e., performs a part of the function of the magnetic head. The soft magnetic underlayer can achieve a function of applying a sufficiently steep perpendicular magnetic field to the magnetic field recording layer, thereby increasing the recording/reproduction efficiency.

Examples of the soft magnetic layer as described above are CoZrNb, CoB, CoTaZr, FeSiAl, FeTaC, CoTaC, NiFe, Fe, FeCoB, FeCoN, FeTaN, and CoIr.

The soft magnetic underlayer may also be a multilayered film including two or more layers. In this multilayered film, the materials, compositions, and thicknesses of the layers may be different. It is also possible to form a triple-layered structure in which two soft magnetic underlayers are stacked with a thin Ru layer being sandwiched between them. The thickness of the soft magnetic underlayer is properly adjusted by taking account of the balance between the OW characteristic and SNR.

(Adhesion Layer)

Figure 5:
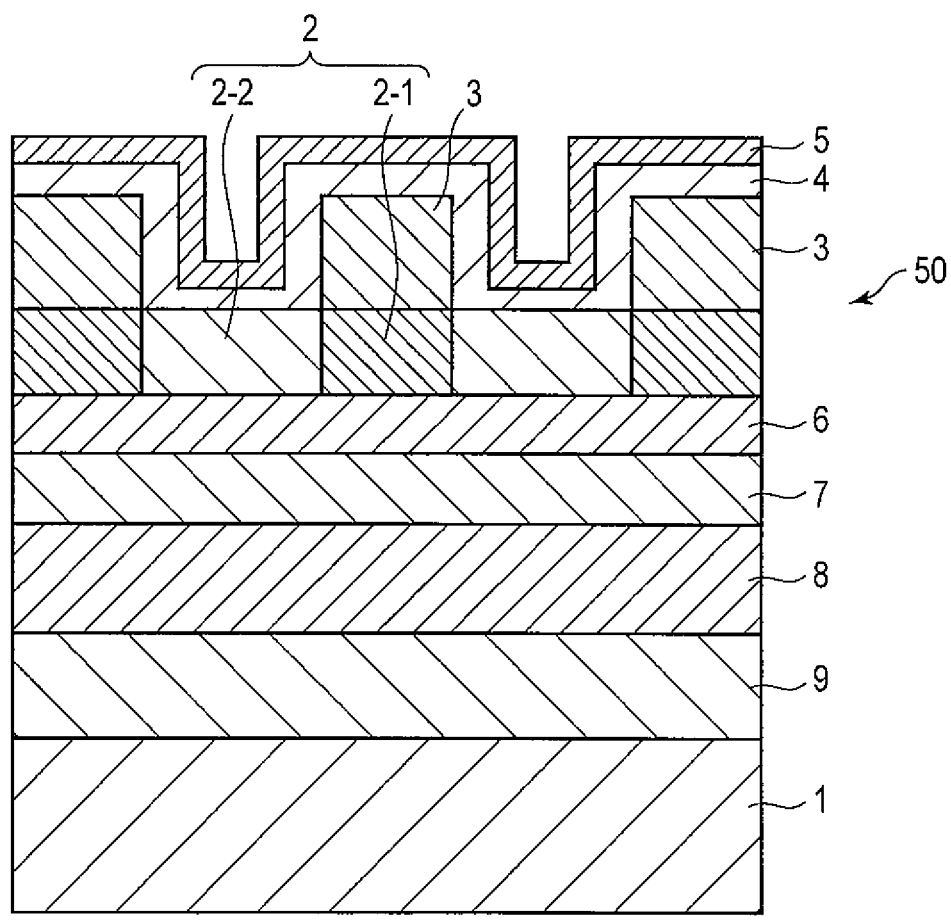
FIG. 5 is a sectional view showing still another example of the magnetic recording medium according to the embodiment.

FIG. 5 is a sectional view showing still another example of the patterned medium according to the embodiment.

In a patterned medium 50 as shown in FIG. 5, an adhesion layer 9, soft magnetic underlayer 8, amorphous seed layer 7, nonmagnetic underlayer 6, auxiliary layer 2, perpendicular magnetic recording layer 3, protective layer 4, and lubricant layer 5 are sequentially stacked on a substrate 1. The perpendicular magnetic recording layer 3 has a pattern in which hard magnetic dots are finely arranged. The auxiliary layer 2 has a structure in which first regions 2-1 made of NiO are two-dimensionally surrounded by a second region 2-2 made of Ni. Hard magnetic dots 3 are stacked on the first regions 2-1 made of NiO.

To increase the mechanical adhesion between the substrate and soft magnetic underlayer, an adhesion layer made of, e.g., Cr, Ti, or an alloy of Cr or Ti may also be formed.

A protective layer can be formed on the perpendicular magnetic recording layer according to the embodiment. Examples of the protective layer are C, diamond-like carbon (DLC), $SiN_x$, $SiO_x$, and $CN_x$.

As a lubricant used in the embodiment, perfluoropolyether (PFPE) or the like can be used.

As a method of depositing each layer, it is possible to use vacuum deposition, sputtering, chemical vapor deposition, or laser abrasion. As sputtering, it is possible to use single-element sputtering using a composite target, or multi-element simultaneous sputtering using targets of different materials.

FIG. 6 is a partially exploded perspective view of an example of a magnetic recording/reproduction apparatus according to the embodiment.

The magnetic recording/reproduction apparatus according to the embodiment includes the above-described patterned medium and a recording/reproduction head.

In a magnetic recording/reproduction apparatus 60 according to the embodiment, a rigid magnetic disk 62 for recording information according to the embodiment is mounted on a spindle 63, and rotated at a predetermined rotational speed by a spindle motor (not shown). A slider 64 on which a recording head for recording information by accessing the magnetic disk 62 and an MR head for reproducing information are mounted is fixed to the distal end of a suspension 65 made of a thin leaf spring. The suspension 65 is connected to one end of an arm 66 including a bobbin for holding a driving coil (not shown).

A voice coil motor 67 as a kind of a linear motor is arranged at the other end of the arm 66. The voice coil motor 67 includes the driving coil (not shown) wound up on the bobbin of the arm 66, and a magnetic circuit including a permanent magnet and counter yoke facing each other so as to sandwich the driving coil between them.

The arm 66 is held by ball bearings (not shown) formed in two, upper and lower portions of a fixed shaft, and pivoted by the voice coil motor 67. That is, the voice coil motor 67 controls the position of the slider 64 on the magnetic disk 62. Note that reference numeral 61 in FIG. 6 denotes a housing.

EXAMPLES

The embodiment will be explained in more detail below by way of its examples.

Example 1

A 2.5-inch nonmagnetic glass substrate (TS-10SX available from OHARA) having the shape of a hard disk was placed in a vacuum chamber of the c-3010 sputtering apparatus available from ANELVA.

After the vacuum chamber of the sputtering apparatus was evacuated to $1 \times 10^{-5}$ Pa or less, 5-nm thick NiO was deposited as an auxiliary layer. The substrate was then heated to 300° C. by using an infrared lamp heater, and 5-nm thick $Fe_{50}Pt_{50}$ was deposited as a perpendicular magnetic recording layer.

After that, the perpendicular magnetic recording layer was patterned into hard magnetic crystal grain dots by the following procedure. That is, the substrate was removed from the sputtering apparatus, spin-coated with a solution prepared by dissolving a PS (polystyrene)-PMMA (polymethylmethacrylate) diblock polymer in an organic solvent, and annealed at 200° C. Then, phase-separated PMMA was removed by RIE using $O_2$ gas, the substrate was spin-coated with SOG, and RIE using $O_2$ gas was performed again, thereby forming a dot-shaped mask made of SOG. Subsequently, the perpendicular magnetic recording layer was etched by Ar ion milling, and the SOG mask was removed by RIE using $CF_4$ gas, thereby forming a 17-nm pitch bit pattern array.

After the mask was removed, the substrate was placed in the sputtering apparatus again and heated to 200° C. by using the infrared lamp heater, and the medium was exposed to hydrogen gas at 1 Pa for 100 sec, thereby performing a reducing process. After that, 6-nm thick C was deposited as a protective film, and the protective film was coated with perfluoropolyether as a lubricant layer by dipping, thereby manufacturing a patterned medium.

The Ar pressure was 0.7 Pa when depositing NiO and C, and 5 Pa when depositing $Fe_{50}Pt_{50}$. Sputtering targets were NiO, $Fe_{50}Pt_{50}$, and C targets each having a diameter of 164 mm. NiO was deposited by RF sputtering, and the rest were deposited by DC sputtering. The input power to each target was 500 W. The distance between each target and the substrate was 50 mm.

In addition, media were manufactured by using $Co_{50}Pt_{50}$ and $Fe_{50}Pd_{50}$ instead of $Fe_{50}Pt_{50}$.

Comparative Example 1

As a comparative example, a patterned medium was manufactured following the same procedures as in Example 1 except that no reducing process was performed.

The crystal structure and crystal face orientation of each obtained patterned medium were evaluated by the θ-2θ method by generating a Cu-Kα line at an acceleration voltage of 45 kV with a filament current of 40 mA by using the X'pert-MRD X-ray diffraction apparatus available from Philips.

The composition of the section of each patterned medium was analyzed by using TEM-EDX at an acceleration voltage of 400 kV.

The magnetic characteristic in the direction perpendicular to the perpendicular magnetic recording layer of each patterned medium was evaluated by measuring a residual magnetization curve with a maximum applied magnetic field of 20 kOe by using the model-10 vibrating sample magnetometer (VSM) available from ADE, U.S.A. The SFD of each patterned medium was evaluated by a half-width calculated by differentiating the obtained residual magnetization curve by the applied magnetic field.

To check the recording stability of the magnetic dots of each patterned medium, AC demagnetization was performed on the medium by using the VSM, and the magnetization configuration in the AC state was evaluated by using a magnetic force microscope (MFM).

The results of XRD evaluation demonstrate that in the media of Example 1 and Comparative Example 1, any hard magnetic dot was crystalline, and any magnetic crystal grain had the $L1_0$ structure and was (001)-oriented.

In any medium of Example 1 and Comparative Example 1, NiO was formed and (100)-oriented.

The results of TEM-EDX evaluation reveal that in the auxiliary layer of the medium of Example 1, both NiO and Ni existed, NiO existed in a region covered with the hard magnetic dot, and Ni existed in a region not covered with the hard magnetic dot. In the direction of depth, Ni existed over 5 nm, i.e., the same as the NiO film thickness.

When the magnetization configuration after AC demagnetization was observed with the MFM, no magnetic domain was formed over a plurality of hard magnetic dots in any medium, so magnetization reversal by each hard magnetic dot was possible.

Table 1 shows the residual coercive force Hr and SFD obtained by VSM measurement, the NiO (100) orientation dispersion $\Delta\theta_{50}$ (NiO) and FePt (001) orientation dispersion $\Delta\theta_{50}$ (Mag) obtained by XRD evaluation, and the order S.

TABLE 1

|  | Perpendicular magnetic recording layer | $\Delta\theta_{50}$ (NiO) (°) | $\Delta\theta_{50}$ (Mag) (°) | S | Hr (kOe) | SFD (%) |
|---|---|---|---|---|---|---|
| Example 1 | FePt | 4.1 | 4.5 | 0.95 | 10.2 | 8.1 |
| Example 1 | CoPt | 4.1 | 4.1 | 0.96 | 9.5 | 8.0 |
| Example 1 | FePd | 4.1 | 3.9 | 0.95 | 9.2 | 7.8 |
| Comparative Example 1 | FePt | 4.0 | 4.3 | 0.95 | 10.5 | 38 |

When compared to Comparative Example 1, the SFD of the medium of Example 1 significantly reduced. The medium using $Co_{50}Pt_{50}$ or $Fe_{50}Pd_{50}$ instead of $Fe_{50}Pt_{50}$ as the hard magnetic dot material showed the same tendency.

Example 2

Patterned media were manufactured following the same procedures as in Example 1 except that the substrate heating temperature was changed from 200° C. to 750° C. after the NiO layer was formed.

The results of XRD evaluation indicate that the hard magnetic dots of any medium were crystalline, and any magnetic crystal grain had the $L1_0$ structure and was (001)-oriented.

Also, NiO was formed and (100)-oriented in any medium.

The results of TEM-EDX evaluation reveal that in the auxiliary layer of any medium, both NiO and Ni existed, NiO existed in a region covered with the hard magnetic dot, and Ni existed in a region not covered with the hard magnetic dot. In the direction of depth, Ni existed over 5 nm, i.e., the same as the NiO film thickness.

When the magnetization configuration after AC demagnetization was observed with the MFM, no magnetic domain was formed over a plurality of hard magnetic dots in any medium, so magnetization reversal by each hard magnetic dot was possible.

Table 2 shows the residual coercive force Hr and SFD obtained by VSM measurement, the NiO (100) orientation dispersion $\Delta\theta_{50}$ (NiO) and FePt (001) orientation dispersion $\Delta\theta_{50}$ (Mag) obtained by XRD evaluation, and the order S.

TABLE 2

|  | Substrate temperature (° C.) | $\Delta\theta_{50}$ (NiO) (°) | $\Delta\theta_{50}$ (Mag) (°) | S | Hr (kOe) | SFD (%) |
|---|---|---|---|---|---|---|
| Example 2 | 200 | 4.1 | 4.5 | 0.31 | 4.1 | 15.1 |
| Example 2 | 250 | 4.0 | 4.5 | 0.81 | 9.3 | 10.1 |
| Example 1 | 300 | 4.1 | 4.5 | 0.95 | 10.2 | 8.1 |
| Example 2 | 350 | 4.1 | 4.2 | 0.95 | 10.3 | 8.1 |
| Example 2 | 400 | 4.2 | 4.4 | 0.93 | 10.2 | 8.0 |
| Example 2 | 450 | 4.1 | 5.1 | 0.85 | 9.6 | 10.1 |
| Example 2 | 500 | 4.0 | 5.2 | 0.85 | 9.5 | 10.2 |
| Example 2 | 600 | 4.2 | 5.2 | 0.84 | 9.7 | 10.0 |
| Example 2 | 700 | 4.2 | 5.1 | 0.82 | 9.5 | 10.2 |
| Example 2 | 800 | 4.2 | 6.5 | 0.81 | 9.0 | 15.2 |

Table 2 shows that the order S can remarkably improve when the substrate temperature is 250° C. or more, and can further improve when the substrate temperature is 300° C. to 400° C.

Example 3

Patterned media were manufactured following the same procedures as in Example 1 except that the Ar pressure was changed from 0.5 to 15 Pa when depositing $Fe_{50}Pt_{50}$.

The results of XRD evaluation indicate that the hard magnetic dots of any medium were crystalline, and any magnetic crystal grain had the $L1_0$ structure and was (001)-oriented.

Also, NiO was formed and (100)-oriented in any medium.

The results of TEM-EDX evaluation reveal that in the auxiliary layer of any medium, both NiO and Ni existed, NiO existed in a region covered with the hard magnetic dot, and Ni existed in a region not covered with the hard magnetic dot. In the direction of depth, Ni existed over 5 nm, i.e., the same as the NiO film thickness.

When the magnetization configuration after AC demagnetization was observed with the MFM, no magnetic domain was formed over a plurality of hard magnetic dots in any medium, so magnetization reversal by each hard magnetic dot was possible.

Table 3 shows the residual coercive force Hr and SFD obtained by VSM measurement, the NiO (100) orientation dispersion $\Delta\theta_{50}$ (NiO) and FePt (001) orientation dispersion $\Delta\theta_{50}$ (Mag) obtained by XRD evaluation, and the order S.

TABLE 3

|  | Deposition pressure (Pa) | $\Delta\theta_{50}$ (NiO) (°) | $\Delta\theta_{50}$ (Mag) (°) | S | Hr (kOe) | SFD (%) |
| --- | --- | --- | --- | --- | --- | --- |
| Example 3 | 0.5 | 4.1 | 3.9 | 0.55 | 5.3 | 15.1 |
| Example 3 | 1 | 4.0 | 4.1 | 0.65 | 6.1 | 14.1 |
| Example 3 | 3 | 4.1 | 4.1 | 0.81 | 9.5 | 10.1 |
| Example 1 | 5 | 4.1 | 4.5 | 0.95 | 10.2 | 8.1 |
| Example 3 | 9 | 4.2 | 4.9 | 0.97 | 10.5 | 8.1 |
| Example 3 | 12 | 4.0 | 5.0 | 0.95 | 10.2 | 8.2 |
| Example 3 | 15 | 4.1 | 5.9 | 0.80 | 9.8 | 9.8 |

Table 3 demonstrates that the order S can noticeably improve when the perpendicular magnetic recording layer deposition pressure is 3 to 12 Pa, and can further improve when the deposition pressure is 5 to 10 Pa.

Example 4

A 2.5-inch nonmagnetic glass substrate (TS-10SX available from OHARA) having the shape of a hard disk was placed in a vacuum chamber of the c-3010 sputtering apparatus available from ANELVA.

After the vacuum chamber of the sputtering apparatus was evacuated to $1\times10^{-5}$ Pa or less, 10-nm thick Cr-50% Ti as an adhesion layer, a 50-nm thick Co-5% Zr-5% Nb alloy as a soft magnetic underlayer, and 5-nm thick MgO as a nonmagnetic underlayer were deposited. After that, auxiliary layer deposition, perpendicular magnetic recording layer deposition, patterning, a reducing process, protective film deposition, and lubricant coating were sequentially performed following the same procedures as in Example 1, thereby manufacturing a patterned medium. Media using TiN, Cr, and Ni instead of MgO as nonmagnetic underlayers were also manufactured.

Comparative Example 2

A patterned medium of a comparative example was manufactured following the same procedures as in Example 4 except that Ni was used instead of NiO as an auxiliary layer.

The results of XRD evaluation indicate that the hard magnetic dots of any medium were crystalline, and any magnetic crystal grain had the $L1_0$ structure and was (001)-oriented.

In any medium of the example, NiO was formed and (100)-oriented.

In the medium of Comparative Example 2, no NiO was formed, and Ni was (100)-oriented.

The soft magnetic underlayer of any medium was amorphous.

Any nonmagnetic underlayer was (100)-oriented.

The results of TEM-EDX evaluation reveal that in the auxiliary layer of any medium of the example, both NiO and Ni existed, NiO existed in a region covered with the hard magnetic dot, and Ni existed in a region not covered with the hard magnetic dot. In the direction of depth, Ni existed over 5 nm. Accordingly, in the medium using NiO as the nonmagnetic underlayer, NiO in the 5-nm thick nonmagnetic underlayer was not reduced.

On the other hand, in the medium of Comparative Example 2, the auxiliary layer did not contain NiO and contained Ni alone.

When the magnetization configuration after AC demagnetization was observed with the MFM, no magnetic domain was formed over a plurality of hard magnetic dots in any medium of the example, so magnetization reversal by each hard magnetic dot, which is required of a patterned medium, was possible. On the other hand, in the medium of Comparative Example 2, large magnetic domains having a diameter of a few ten nm or more were formed, indicating that a strong exchange interaction was acting between the hard magnetic dots due to the Ni auxiliary layer. Accordingly, magnetization reversal by each hard magnetic dot was difficult, so the medium was unsuitable as a patterned medium.

Table 4 shows the residual coercive force Hr and SFD obtained by VSM measurement, the NiO (100) orientation dispersion $\Delta\theta_{50}$ (NiO) and FePt (001) orientation dispersion $\Delta\theta_{50}$ (Mag) obtained by XRD evaluation, and the order S.

TABLE 4

|  | Nonmagnetic underlayer | $\Delta\theta_{50}$ (NiO) (°) | $\Delta\theta_{50}$ (Mag) (°) | S | Hr (kOe) | SFD (%) |
| --- | --- | --- | --- | --- | --- | --- |
| Example 4 | MgO | 3.4 | 3.6 | 0.92 | 10.8 | 6.8 |
| Example 4 | TiN | 3.4 | 3.7 | 0.94 | 10.4 | 6.8 |
| Example 4 | Cr | 3.6 | 3.9 | 0.95 | 10.8 | 7.0 |
| Example 4 | NiO | 3.5 | 4.0 | 0.95 | 10.7 | 7.1 |
| Comparative Example 2 | NiO | 4.1 | 4.5 | 0.91 | 6.3 | 5.1 |
| Example 1 | — | 4.1 | 4.5 | 0.95 | 10.2 | 8.1 |

When using the nonmagnetic underlayer, the (001) orientation dispersion of the hard magnetic crystal grains reduced, and the SFD reduced. Note that the SFD of the medium of Comparative Example 2 apparently reduced perhaps because a strong exchange interaction was acting between the dots as described above.

Example 5

After a soft magnetic underlayer was deposited in the same manner as in Example 4, 5-nm thick Ni-40% Ta was deposited as an amorphous seed layer. Then, Ar-1% $O_2$ gas was supplied such that the chamber internal pressure was $5\times10^{-2}$ Pa, and the surface of the amorphous seed layer was exposed to this $Ar/O_2$ ambient for 5 sec. After that, 5-nm thick Cr was deposited as a nonmagnetic underlayer, and NiO deposition, substrate heating, perpendicular magnetic recording layer deposition, patterning, a reducing process, protective film deposition, and lubricant coating were sequentially performed following the same procedures as in Example 4. Media using Ni-40% Nb, Ni-40% Zr, Ni-40% Mo, and Ni-40% V as amorphous seed layers were also manufactured.

The results of XRD evaluation indicate that the hard magnetic dots of any medium were crystalline, and any magnetic crystal grain had the $L1_0$ structure and was (001)-oriented. In any medium, NiO was formed and (100)-oriented. The soft magnetic underlayer of any medium was amorphous.

Cr in the nonmagnetic underlayer of any medium was (100)-oriented.

The seed layer of any medium was amorphous.

The results of TEM-EDX evaluation reveal that in the auxiliary layer of any medium, both NiO and Ni existed, NiO existed in a region covered with the hard magnetic dot, and Ni existed in a region not covered with the hard magnetic dot. In the direction of depth, Ni existed over 5 nm, i.e., the same as the NiO film thickness.

When the magnetization configuration after AC demagnetization was observed with the MFM, no magnetic domain was formed over a plurality of hard magnetic dots in any medium, so magnetization reversal by each hard magnetic dot was possible.

Table 5 shows the residual coercive force Hr and SFD obtained by VSM measurement, the NiO (100) orientation dispersion $\Delta\theta_{50}$ (NiO) and FePt (001) orientation dispersion $\Delta\theta_{50}$ (Mag) obtained by XRD evaluation, and the order S.

TABLE 5

| | Amorphous seed layer | $\Delta\theta_{50}$ (NiO) (°) | $\Delta\theta_{50}$ (Mag) (°) | S | Hr (kOe) | SFD (%) |
|---|---|---|---|---|---|---|
| Example 5 | NiTa | 3.0 | 2.9 | 0.91 | 10.8 | 5.9 |
| Example 5 | NiNb | 3.1 | 3.0 | 0.94 | 10.4 | 6.0 |
| Example 5 | NiZr | 3.0 | 3.1 | 0.93 | 10.8 | 6.1 |
| Example 5 | NiMo | 3.1 | 3.2 | 0.94 | 10.7 | 6.2 |
| Example 5 | NiV | 2.9 | 3.1 | 0.91 | 6.3 | 6.3 |
| Example 4 | — | | 3.6 | 3.9 | 0.95 | 10.8 | 7.0 |

When using the amorphous seed layer, the (001) orientation distribution of NiO in the auxiliary layer and the hard magnetic crystal grains significantly reduced, and the SFD remarkably reduced.

The embodiment or each example described above provides a patterned medium capable of high-density recording by reducing the switching field distribution of each magnetic dot and increasing the thermal decay resistance, thereby making high-density recording possible.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a magnetic recording medium, the method comprising:
    forming, on a substrate, an auxiliary layer by depositing a (100)-oriented nickel oxide;
    forming, on the auxiliary layer, a perpendicular magnetic recording layer made of a (001)-oriented alloy comprising an element selected from the group consisting of iron and cobalt and an element selected from the group consisting of platinum and palladium, and having an $L1_0$ structure;
    partially exposing the auxiliary layer by processing the perpendicular magnetic recording layer into a magnetic dot pattern; and
    depositing a protective layer on the perpendicular magnetic recording layer,
    wherein before the protective layer is formed, the magnetic dot pattern and the auxiliary layer are exposed to a reducing ambient, and the partially exposed auxiliary layer is reduced by using the magnetic dot pattern as a mask, thereby forming, in the auxiliary layer, a dot-like first region covered with the magnetic dot pattern and made of the nickel oxide, and a second region not covered with the magnetic dot pattern and comprising nickel as a main component.

2. The method of claim 1, wherein forming the perpendicular magnetic recording layer material comprises heating the substrate to 250° C. to 700° C.

3. The method of claim 1, wherein depositing the perpendicular magnetic recording layer comprises sputtering at a pressure of 3 to 12 Pa.

* * * * *